(12) United States Patent
O'Sullivan et al.

(10) Patent No.: US 8,050,798 B2
(45) Date of Patent: Nov. 1, 2011

(54) DYNAMIC PROGRAM MODULE GENERATION FOR MANIPULATING VEHICLE FRAME

(75) Inventors: Kevin Paul O'Sullivan, Preston (GB); James Scott Rhodes, Jr., Redmond, WA (US); Robert Kelvin Lawton, Sandbach (GB); William A. Layman, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 929 days.

(21) Appl. No.: 11/385,262

(22) Filed: Mar. 20, 2006

(65) Prior Publication Data
US 2007/0220482 A1 Sep. 20, 2007

(51) Int. Cl.
G05B 19/4093 (2006.01)
G06F 9/44 (2006.01)
G06F 19/00 (2011.01)
G05B 19/04 (2006.01)

(52) U.S. Cl. ......... 700/245; 700/246; 700/248; 700/253

(58) Field of Classification Search .................... 700/97, 700/245, 257, 259, 95, 100, 105, 123, 213, 700/225, 246; 703/1, 2, 8, 22, 717; 345/156, 345/629, 619; 29/430; 901/43, 50
See application file for complete search history.

(56) References Cited

U.S. PATENT DOCUMENTS

| | | | | |
|---|---|---|---|---|
| 4,332,012 A * | 5/1982 | Sekine et al. | | 700/116 |
| 4,611,380 A * | 9/1986 | Abe et al. | | 29/430 |
| 4,835,730 A * | 5/1989 | Shimano et al. | | 700/257 |
| 5,251,122 A * | 10/1993 | Sakamoto et al. | | 700/18 |
| 5,319,840 A * | 6/1994 | Yamamoto et al. | | 29/430 |
| 5,485,620 A * | 1/1996 | Sadre et al. | | 717/162 |
| 5,521,477 A * | 5/1996 | Sasaki | | 318/568.18 |
| 5,645,884 A | 7/1997 | Harlow, Jr. | | |
| 5,814,375 A | 9/1998 | Hissen | | |
| 6,089,440 A * | 7/2000 | Brusha | | 228/44.3 |
| 6,112,133 A | 8/2000 | Fishman | | |
| 2004/0084520 A1* | 5/2004 | Muehl et al. | | 235/376 |
| 2004/0115359 A1 | 6/2004 | Cebola | | |
| 2004/0213915 A1* | 10/2004 | Andersen | | 427/421.1 |
| 2005/0051085 A1* | 3/2005 | Krogedal et al. | | 118/313 |
| 2005/0096885 A1* | 5/2005 | Rhodes et al. | | 703/1 |
| 2006/0152533 A1* | 7/2006 | Read | | 345/653 |

* cited by examiner

*Primary Examiner* — Khoi Tran
*Assistant Examiner* — Dale Moyer
(74) *Attorney, Agent, or Firm* — Christensen O'Connor Johnson Kindness PLLC (57) ABSTRACT

A system and method for generating a set of programming instructions for manipulating a vehicle frame are provided. A frame computing device obtains configuration information for an identified vehicle frame. The frame computing device sub-divides the selected vehicle frame into a set of regions and obtains programming modules for each of the components mounted in the set of regions. The frame computing device processes the program modules to generate a cumulative set of programming instructions for manipulating the vehicle frame.

21 Claims, 7 Drawing Sheets

DYNAMIC PROGRAM MODULE GENERATION FOR MANIPULATING VEHICLE FRAME

FIELD OF THE INVENTION

In general, the present invention relates to computer software and manufacturing, and in particular, to a system and method for automating the generation of programming modules for manipulating vehicle frames.

BACKGROUND OF THE INVENTION

Generally described, the manufacture of vehicles, especially large commercial vehicles, can require a specification of a number of components that are to be included with the vehicle. In many instances, a purchaser, or designer, can select from a number of options for each component to be included in the vehicle. For example, a purchaser may have the ability to select from more than a half dozen variations of fuel tank components for a commercial truck. In turn, each specified component can correspond to one or more pieces of geometry that make up the component. For example, a fuel tank component can include one piece of geometry that corresponds to the tank, two or more pieces of geometry that correspond to straps/brackets for mounting the tank and a number of additional pieces of geometry that correspond to mounting bolts that attach the tank to the straps/brackets and that attach the straps/brackets to the frame. As the number of component options increase, the design of the vehicle, often referred to as a frame design, becomes customized and unique for each truck.

In a typical large-scale manufacturing environment, automated robotic systems can be utilized to apply paint to the vehicle frame and its mounted components. One skilled in the relevant art will appreciate that automated robotic systems can be programmed by a series of instructions that control the movement of the robotic components, such as robotic arms, to achieve a desired result. As applied to painting, the automated robotic systems can be programmed to execute a series of steps designed to apply paint to the vehicle frame and its unique components.

Although automated robotic system can facilitate the manufacturing process, current approaches to generating a set of instructions for the automated robotic system can become deficient for highly customizable items. With specific reference to vehicle frame painting, current declarative programming approaches for automated robotic systems typically require that a customized set of programming instructions be generated for each vehicle frame to be painted. This current approach can be inefficient in the additional time to program specific instructions for each vehicle frame.

Thus, there is a need for a system and method for automating the generation of programming code for manipulating frame design components.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for generating a set of programming instructions for manipulating a vehicle frame are provided. A frame computing device obtains configuration information for an identified vehicle frame. The frame computing device subdivides the selected vehicle frame into a set of regions and obtains programming modules for each of the components mounted in the set of regions. The frame computing device processes the program modules to generate a cumulative set of programming instructions for manipulating the vehicle frame.

In accordance with an aspect of the present invention, a method for generating a set of programming instructions corresponding to the manipulation of an apparatus is provided. A computing device obtains a representation of an apparatus having a unique configuration. The computing device subdivides the representation of the apparatus into a plurality of regions. For each region, the computing device obtains an identification of programming instructions corresponding to a manipulation of components associated with the apparatus and corresponding to the unique configuration. Additionally, the computing device dynamically generates a cumulative set of programming instructions for the apparatus from the programming instructions from each region. In an illustrative embodiment, the apparatus can correspond to a vehicle frame having a unique configuration of components mounted on the vehicle frame. Additionally, the set of programming instructions can correspond to a set of programming instructions for painting the vehicle frame with the unique configuration.

In another aspect of the present invention, a method for generating a set of programming instructions corresponding to the manipulation of a vehicle frame is provided. A computing device obtains an identification of a vehicle frame and an identification of one or more components mounted on the vehicle frame. The computing device generates a representation of the vehicle frame subdivided into a plurality of regions. For each region, the computing device obtains an identification of programming modules corresponding to a manipulation of components associated with the vehicle frame. The computing device can then compile a cumulative set of programming modules for the vehicle frame from the programming modules from each region.

In a further aspect of the present invention, a computer-readable medium having computer-executable modules for generating a set of programming instructions corresponding to the manipulation of a vehicle frame is provided. The computer-executable modules include a modeling module for generating a representation of a vehicle frame subdivided into a plurality of regions. The representation of the vehicle frame can include an identification of one or more components associated with the vehicle frame. The computer-executable modules can also include a program synthesis module for obtaining an identification of programming instructions corresponding to a manipulation of components associated with the vehicle frame by region. The program synthesis module can also compile a cumulative set of programming instructions for the vehicle frame from the programming instructions from each region.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a system and method for generating customizable programming instructions related to an apparatus having a unique configuration. More specifically, the present invention relates to a system and method for generating programming instructions related to the manipulation of one or more components on a vehicle frame having a unique configuration. Although the present invention will be described with regard to an illustrative set of instructions related to the generation of instructions for painting a vehicle frame and/or the components of a vehicle frame, one skilled in the relevant art will appreciate the disclosed embodiments are illustrative in nature and should not be construed as limiting. Additionally, one skilled in the relevant art will appreciate that manipulation of the vehicle frame and/or components on a vehicle frame can relate to any number of actions, including, but not limited to, manufacture, assembly, painting, inspection, and the like.

Figure 1:
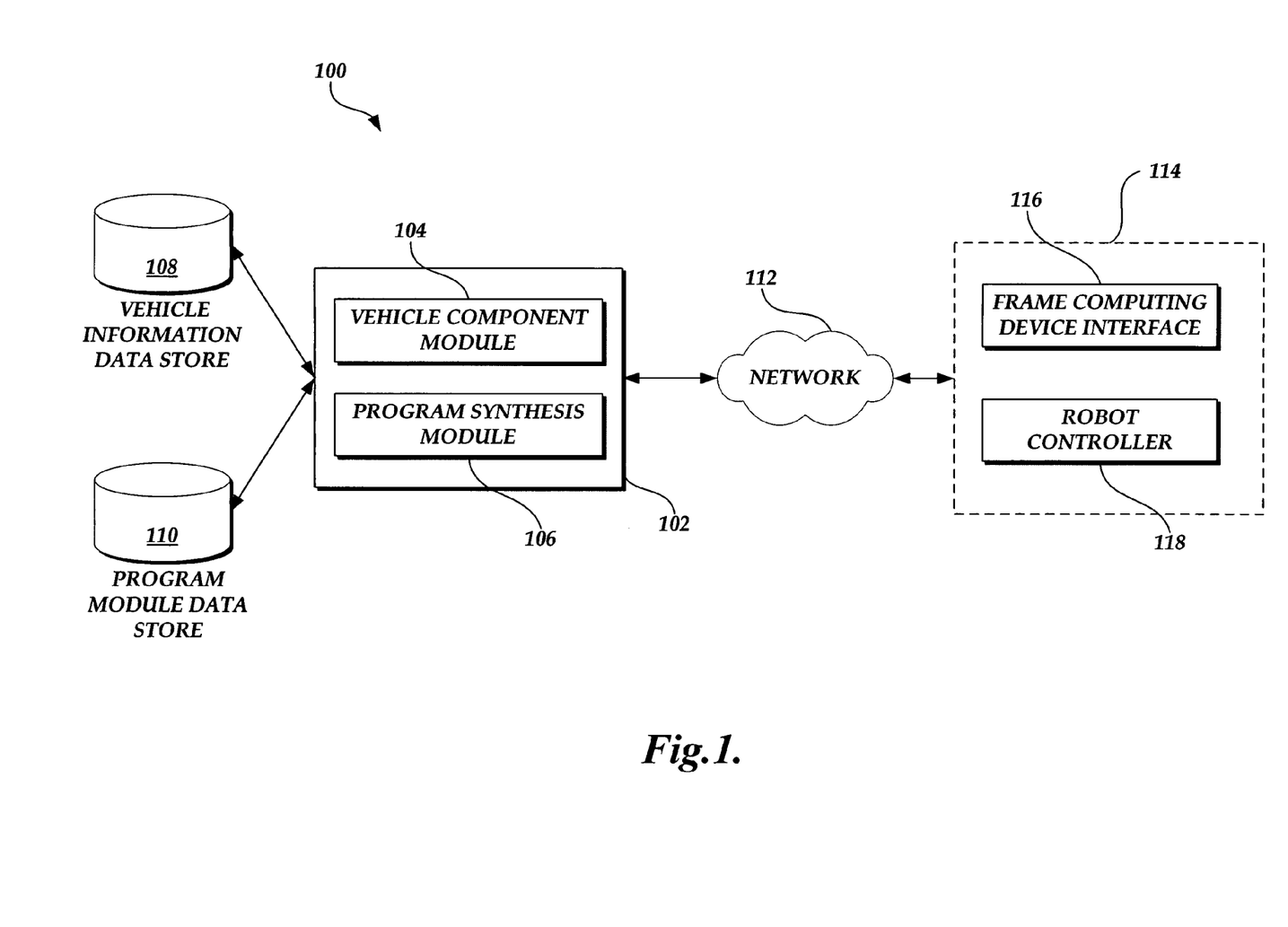
FIG. 1 is a block diagram illustrative of a program module generation system including a frame paint computing system including a vehicle component module and a program synthesis module in communication with a frame painting subsystem in accordance with an aspect of the present invention.

FIG. 1 is a block diagram illustrative a program module generation system 100 formed in accordance with an aspect of the present invention. The program module generation system 100 includes a frame paint computing system 102 for generating a dynamic set of programming instructions or program modules corresponding to a selected vehicle frame. More specifically, the frame paint computing system 102 can include a vehicle component module 104 for obtaining a representation of a vehicle frame and one or more components mounted on the selected vehicle frame. The frame computing system 102 can also include a program synthesis module 106 for generating a set of programming instructions for manipulating a vehicle frame and/or one more components mounted on the vehicle frame. Although the vehicle component module 104 and the program synthesis module 106 are illustrated as located on the frame computing system 102, one skilled in the relevant art will appreciate the modules may be distributed across multiple computing systems. Additionally, one or more functions described for either the vehicle component module 104 or the program synthesis module 106 may be distributed among different computing devices in the program module generation system 100.

In communication with the frame computing system 102 via a communication network 112 is a frame painting subsystem 114. In an illustrative embodiment, the frame painting subsystem 114 includes various components for obtaining programming instructions regarding the manipulation of a vehicle frame and for controlling various physical devices in accordance with the programming instructions. As illustrated in FIG. 1, the frame painting subsystem 114 can include a frame computing device interface 116 component for providing an interface to the frame computing system 102. In an illustrative embodiment, the frame computing device interface 116 can generate a graphical user interface for manipulation of various painting subsystem components. Additionally, the frame computing device interface 116 can also provide the interface for receiving the programming instructions from the frame computing device 102. The frame painting subsystem 114 can also include a robot controller component 118 for controlling various robotic components in accordance with programming instructions received from the frame computing device. In an illustrative embodiment, the robot control component 118 can include any number of hardware and/or software modules that interact with hardware/software modules for individual robotic equipment. The frame computing device interface 116 and the robot controller component 118 may be distributed among several computing devices and/or across a communication network, such as the Internet or an intranet.

Figure 2A:
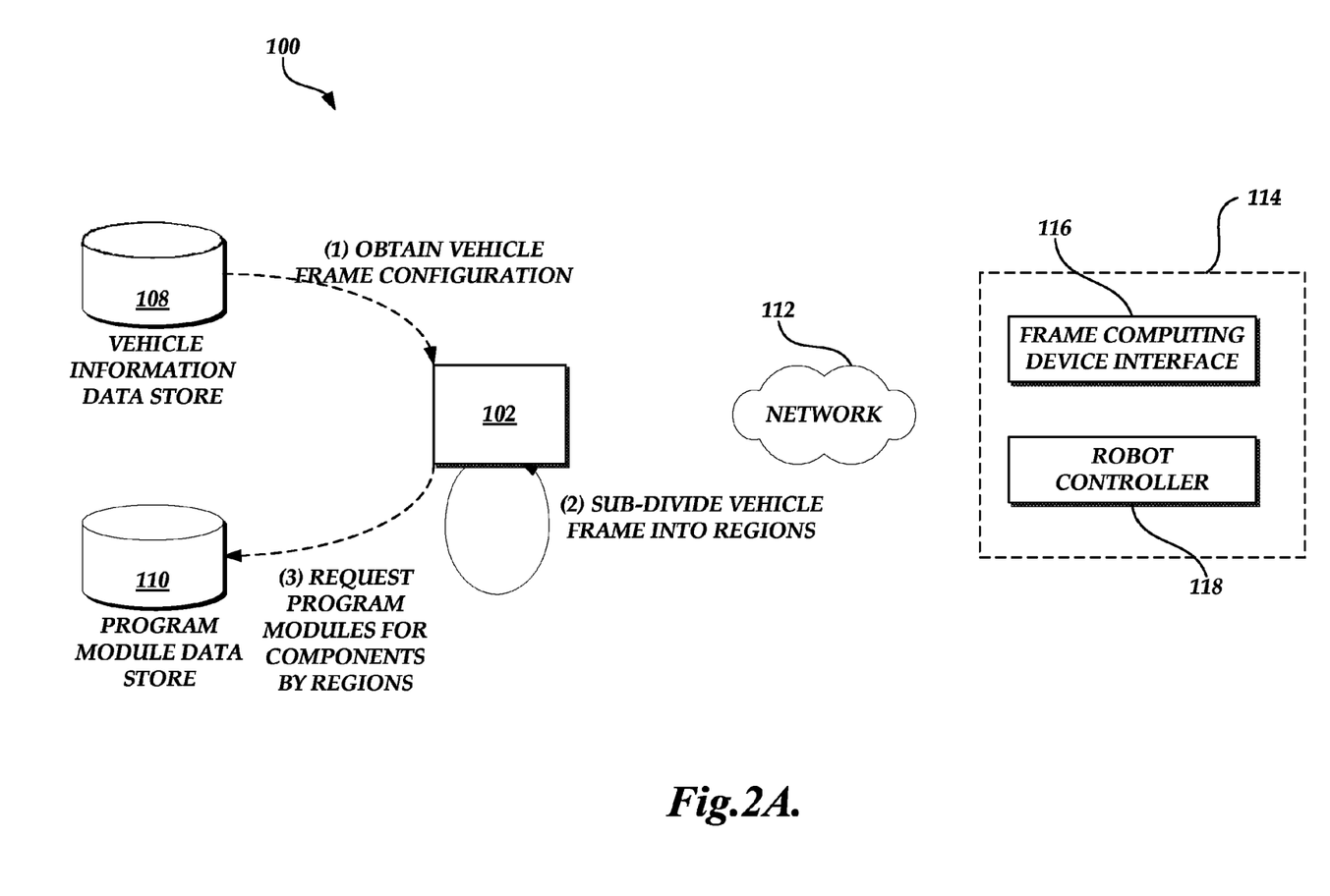
FIG. 2A is a block diagram of the program module generation system of FIG. 1 illustrating the identification of vehicle-specific components on a selected frame and the transmittal of a request for program sub-modules corresponding to the identified components in accordance with an aspect of the present invention.
Figure 2B:
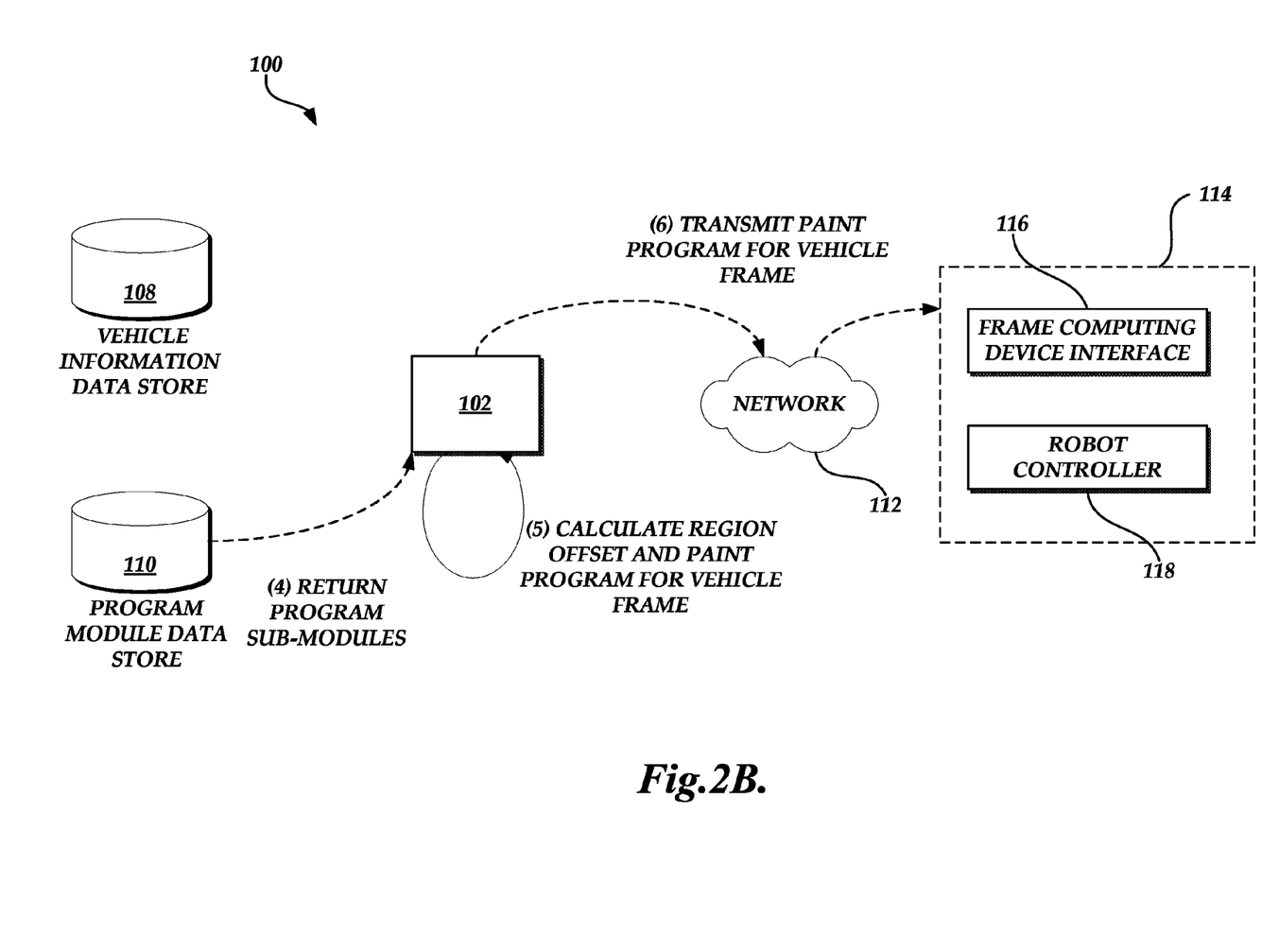
FIG. 2B is a block diagram of the program module generation system of FIG. 1 illustrating transmittal of the requested program sub-modules and the compiling of a frame paint program in accordance with an aspect of the present invention.

With reference now to FIGS. 2A and 2B, in an illustrative embodiment of the present invention, the program module generation system 100 can be utilized to manipulate a vehicle with a unique configuration of components mounted thereon. More specifically, in an illustrative embodiment, the program module generation system 100 may utilized to generate a set of programming instructions for controlling a robotic painting system that can include one or more painting robot components. In an embodiment in which each vehicle has a unique set of mounted components and a unique layout for the set of mounted components, the program module generation system 100 can be utilized to generate a unique set of programming instructions for each vehicle.

Referring to FIG. 2A, the frame painting computing device 102 obtains vehicle frame configuration information that identifies the dimensions of an underlying vehicle frame, the unique set of components mounted on the vehicle frame and mounting location for each of the identified components: In an illustrative embodiment, the configuration information can be in the form of a representation of the vehicle frame and mounted components. The frame painting computing device 102 subdivides the representation of the vehicle frame and components into a set of regions. In an illustrative embodiment, the frame painting computing device 102 subdivides the regions such that at least two regions include the front axle and rear axles associated with a vehicle frame. For each defined region, the frame painting computing device 102 requests programming instructions from the program module data store 110. The requested programming instructions correspond to a pre-defined set of instructions that define how to paint particular mounted components and/or portions of the vehicle frame.

Referring now to FIG. 2B, the program module data store 110 returns the requested program modules to the frame painting computing device 102. The frame painting computing device 102 process the requested program modules to generate a paint program for the vehicle. In an illustrative embodiment, the frame paint computing device 102 may incorporate a region offset and/or other geometric definitions in the program modules. Additionally, the frame paint computing device 102 may also optimize the set of program instructions by eliminating redundant program instructions and/or reordering program instructions. The frame painting computing device 102 can then transmit the paint program to the frame painting subsystem 114 for implementation. In an illustrative embodiment, the frame computing device 102 can transmit the paint program in a single transmission or as a series of transmissions.

Figure 3:
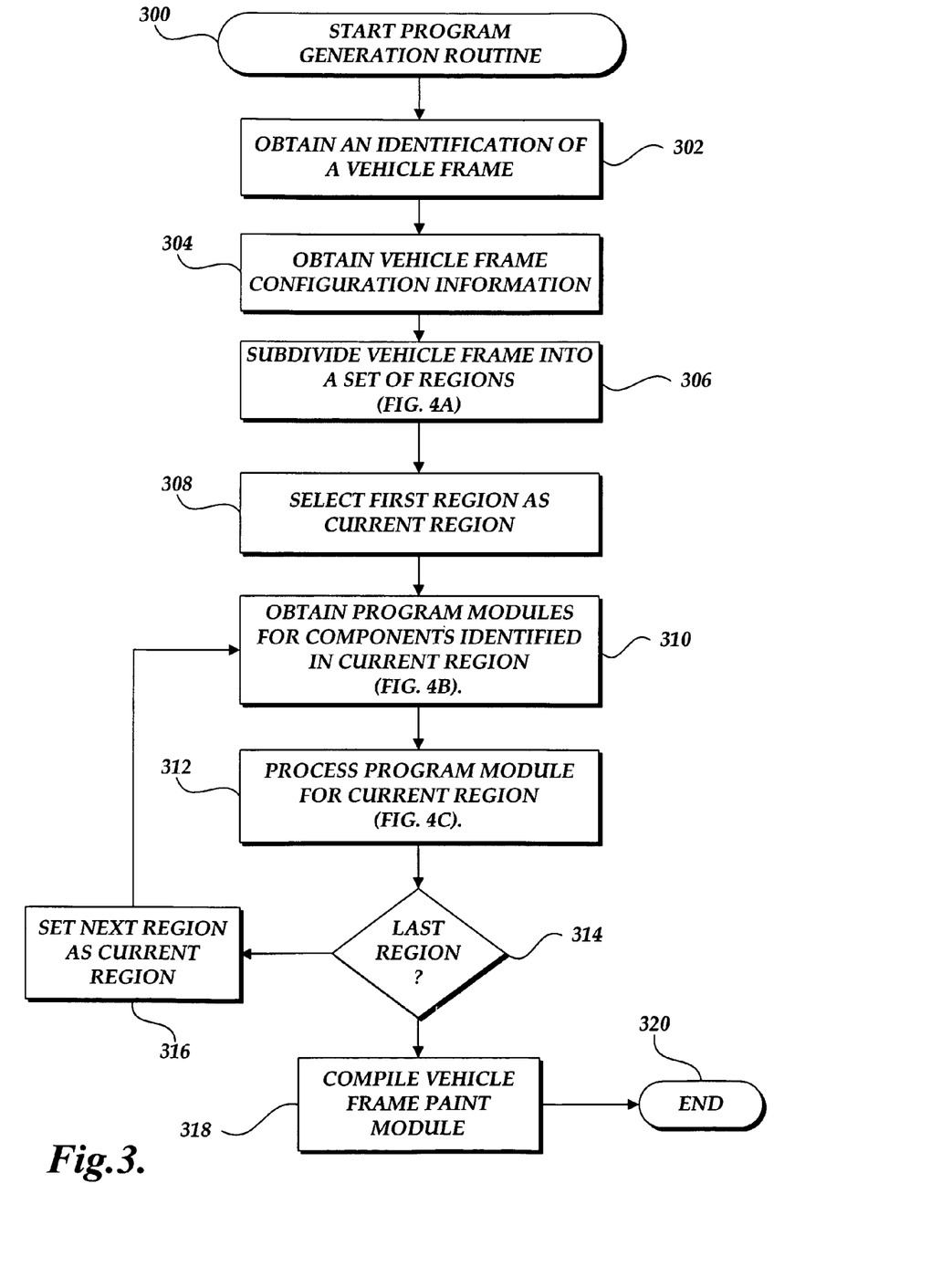
FIG. 3 is a flow diagram of a program generation routine implemented by the frame paint computing system in accordance with an aspect of the present invention.

With reference now to FIG. 3, a program generation routine 300 implemented by the frame paint computing system 102 for generating vehicle frame paint programs will be described. As previously mentioned, although the program generation routine 300 will be described with regard to the generation of paint program instructions, one skilled in the relevant art will appreciate that the routine 300 may be implemented with regard to other forms of vehicle component manipulation. Referring to FIG. 3, at block 302, the frame paint computing device 102 obtains an identification of the vehicle frame. In an illustrative embodiment, each vehicle may include a vehicle identification number ("VIN") that can be identified visually, scanned via barcode or RFID, or otherwise located.

Based on the identification, at block 304, the frame paint computing device 102 obtains vehicle frame configuration information from the vehicle information store 108. In an illustrative embodiment, the vehicle frame configuration information can correspond to an identification of one or more components mounted on the vehicle frame and the mounting location of the components on the vehicle frame. The vehicle frame configuration can correspond to a listing of the components and the relative mounting location on the vehicle frame. Additionally, the vehicle frame configuration can correspond to a graphical representation of the vehicle frame and the mounted components. In an alternative embodiment, the frame paint computing device 102 can generate the graphical representation from the vehicle frame configuration information received from the vehicle information store 108.

Figure 4A:
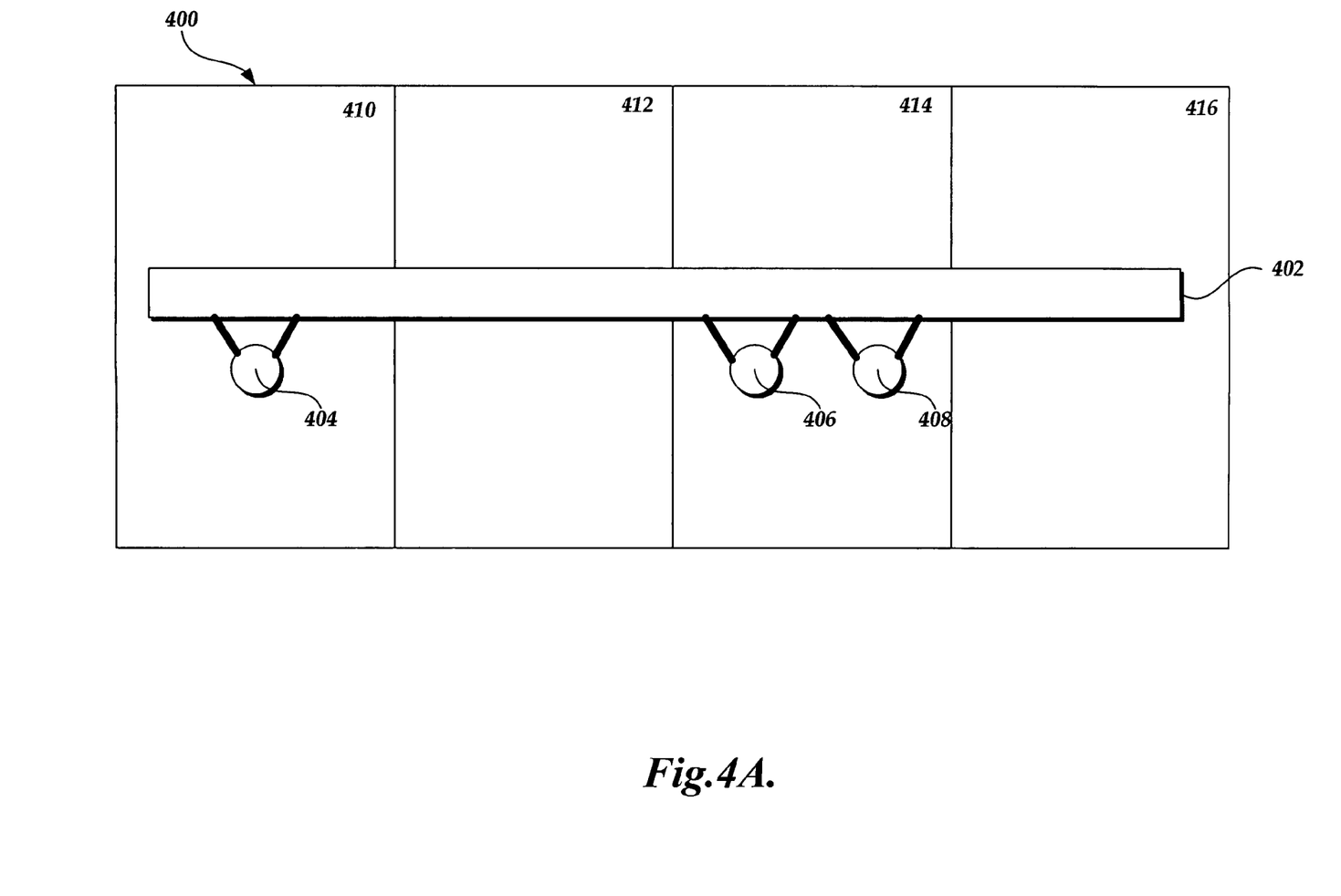
FIG. 4A is a block diagram of a representation of a vehicle frame that has been divided into a number of regions in accordance with an aspect of the present invention.

At block 306, the frame paint computing device 102 sub-divides the representation of the vehicle frame into a set of regions. Referring now to FIG. 4, a representation 400 of a vehicle frame 402 will be described. In the illustrative representation 400, the vehicle frame 402 includes a front axle 404 and rear axles 406/408. The vehicle frame 402 has been sub-divided into four equal sized regions 410, 412, 414 and 416. Regions 410 and 414 encompass the front axle 404 and the rear axles 406/408, respectively. In an alternative embodiment, the frame painting computing device 102 can subdivided the regions into non-equal sized regions. Additionally, the frame paint computing device 102 can also adjust the regions to ensure that each mounted component will only be encompassed within a single defined region. Further, the frame paint computing device 102 can also subdivide the vehicle frame 402 into a different number of regions to incorporate maximum, minimum or optimal region sizes. Still further, the vehicle frame configuration information may already have the representation of the vehicle frame 400 sub-divided into regions.

Figure 4B:
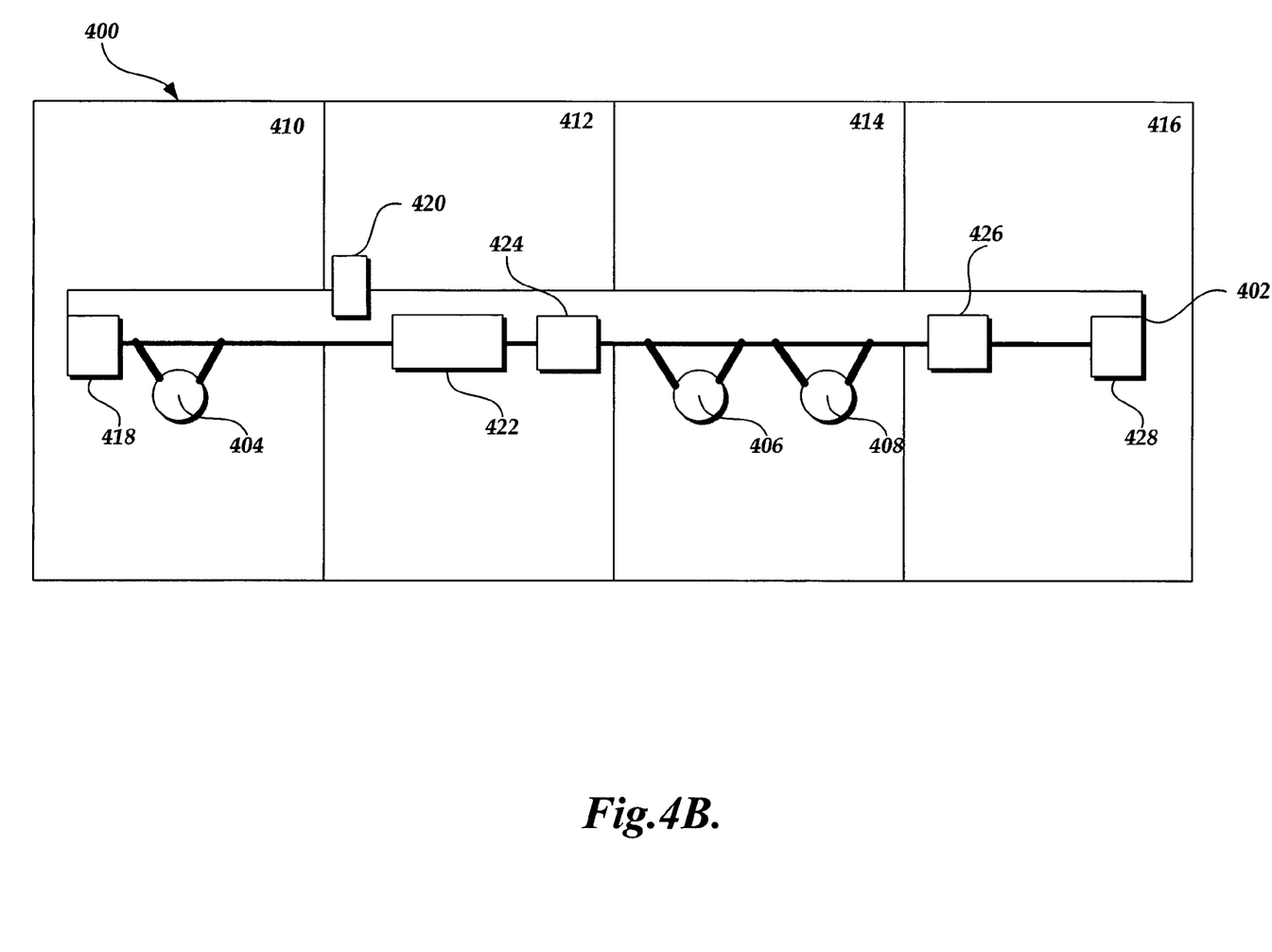
FIG. 4B is a block diagram of the vehicle frame representation of FIG. 4A illustrating the identification of the specific components mounted on the vehicle frame within each region in accordance with an aspect of the present invention.
Figure 4C:
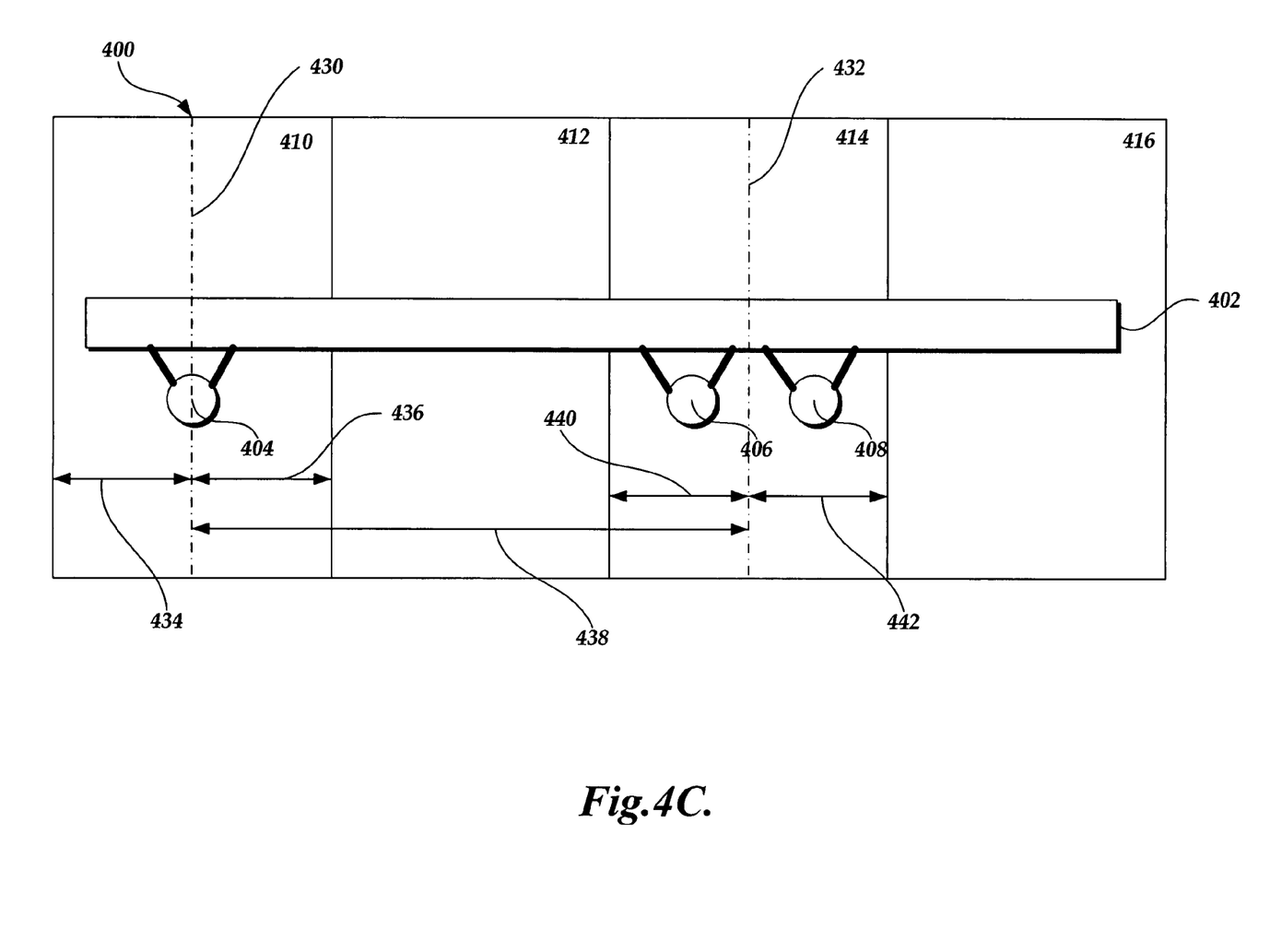
FIG. 4C is a block diagram of the vehicle frame representation of FIG. 4A illustrating the calculation of an offset for each region for use in compiling the paint program in accordance with an aspect of the present invention.

Returning to FIG. 3, at blocks 308-316, the routine 300 enters into an iterative loop for generating a set of programming instructions for each of the identified regions of the vehicle frame. At block 308, the frame paint computing device 102 sets the first identified region, e.g., region 410 (FIG. 4), as the current region. At block 310, the frame paint computing device 102 obtains program modules for each of the components identified in the current region. In an illustrative embodiment, the program module generation system 100 maintains a program module data store 110 that includes a set of program modules for painting portions of a vehicle frame and/or individual components that could be mounted on a vehicle frame. With reference to FIG. 4B, the representation of the vehicle frame 400 can include an identification of each mounted component and the mounted location for each component. For example, components 418 and 428 can correspond to vehicle bumpers and component 420 can correspond to brackets for mounting other components. Components 422, 424, and 426 can correspond to battery boxes, fuel tanks, carriers, and the like. Other components could include cross members, suspensions, drive shafts, cables, lines or pipes, air valves and air tanks, wheel carriers, shields, exhausts, transmissions, silencers, and the like. In turn, the program module data store 110 can include a program module that defines a set of instructions for manipulating, e.g., painting, the specified component. In an illustrative embodiment, the program modules can correspond to a set of declarative instructions that can be eventually processed or understood by the frame painting subsystem 114 to carry out the specified instructions.

Returning to FIG. 3, at block 312, the frame paint computing device 102 processes the program modules. In an illustrative embodiment, the program modules can require the incorporation of a region offset and other location information. For example, the program modules may be defined such that they require the beginning point or middle point of the regions. With reference to FIG. 4B, the representation of the vehicle frame 400 can include an identification of offsets for each of the defined regions 410-416. As illustrated in FIG. 4B, the offset for region 410 is "0". The offset for region 412 corresponds to the sum of the distance between the beginning of the vehicle frame 402 and the middle of the front axle 404, represented as distance 434, and the distance between the middle of the front axle 404 and end of the first region 410, represented as distance 436. The offset for region 414 corresponds to the sum of distance 434 and the wheelbase, represented at 438, minus the distance from the rear axles 406/408 midpoint 432 to the beginning of the third region, represented as distance 440. Finally, the offset for region 416 corresponds to the sum of distance 434 and the wheelbase, represented at 438, plus the distance from the rear axles 406/408 midpoint 432 to the end of the third region 414, represented as distance 442. In an illustrative embodiment, the offsets may be calculated by the vehicle information data store 108 or by the frame paint computing device 102. Additionally, at block 312, the frame paint computing device 102 can optimize the program module instructions by eliminating redundant instructions, resolving conflicting instructions and/or reordering the instructions.

Returning to FIG. 3, at decision block 314, a test is conducted to determine whether any additional regions are left in the representation of the vehicle frame. If so, the frame paint computing device 102 sets the next region as the current region and the routine 300 returns to block 310. If no additional regions remain, at block 318, the frame paint computing device 102 compiles the program modules into a vehicle paint program. In an illustrative embodiment, the frame paint computing device 102 can collect the processed program modules for each region into a series of instructions for the identified vehicle frame. Additionally, the frame paint computing device 102 can optimize the program module instructions by eliminating redundant instructions, resolving conflicting instructions and/or reordering the instructions for the cumulative set of program modules instructions. Still further, in an illustrative embodiment, the frame paint computing device 102 can compile the instructions into a different format required by the particular frame painting subsystem 114. At block 320, the routine 300 ends, which can include the transmission of the paint program to the frame painting subsystem 114.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method executed by one or more computer processors for manipulating a vehicle frame, the method comprising generating a set of processing instructions for manipulating the vehicle frame by:
   obtaining a representation of a vehicle frame having a unique configuration;
   subdividing the representation of the vehicle frame into a plurality of at least four regions each representing a longitudinal segment of the vehicle frame, wherein at least two regions include an axle of the vehicle frame;
   for each region that represents a portion of the vehicle frame, obtaining an identification of local processing instructions corresponding to a manipulation of one or more components associated with the region and corresponding to the unique configuration; and
   dynamically generating a cumulative set of processing instructions for the vehicle frame from the local processing instructions corresponding to each region.

2. The method as recited in claim 1, wherein the unique configuration includes an identification of one or more components mounted on the vehicle frame.

3. The method as recited in claim 2, wherein obtaining a representation of the vehicle frame having a unique configuration includes:
   obtaining an identification of the vehicle frame; and
   obtaining a representation of the vehicle frame identifying the components mounted on the vehicle frame from a data store.

4. The method as recited in claim 2, wherein obtaining an identification of local processing instructions corresponding to a manipulation of components mounted on the vehicle frame and corresponding to the unique configuration includes:
   identifying one or more processing instructions for manipulating each component mounted on the vehicle frame in a current region;
   identifying an offset corresponding to the current region; and
   dynamically associating the offset with the one or more identified processing instructions.

5. The method as recited in claim 2, wherein the one or more processing instructions correspond to instructions for manipulating an automated robotic system.

6. The method as recited in claim 5, wherein the cumulative set of processing instructions correspond to instructions for painting the vehicle frame and the one or more components mounted on the vehicle frame.

7. A method implemented by one or more computer processors for generating a set of processing instructions corresponding to the manipulation of a vehicle frame comprising:
   obtaining an identification of a vehicle frame and an identification of one or more components mounted on the vehicle frame;
   generating a representation of the vehicle frame subdivided into a plurality of regions each representing a portion of the vehicle frame;
   for each region that represents a portion of the vehicle frame, obtaining an identification of local processing modules that correspond to the components within the region; and
   compiling a cumulative set of processing modules for the vehicle frame from the local processing modules from each region, including adjusting a processing effect of the local processing modules for each region based on the other regions of the vehicle frame by at least one of: (1) eliminating redundant instructions; (2) resolving conflicting instructions; and (3) reordering the instructions.

8. The method as recited in claim 7, wherein obtaining an identification of a vehicle frame and an identification of one or more components mounted on the vehicle frame includes obtaining a vehicle identifier and wherein generating a representation of the vehicle frame subdivided into a plurality of regions includes recalling a representation of the vehicle frame corresponding to the vehicle identifier.

9. The method as recited in claim 7, wherein generating a representation of the vehicle frame subdivided into a plurality of regions includes subdividing the vehicle frame into four regions wherein at least two regions include an axle of the vehicle frame.

10. The method as recited in claim 7, wherein obtaining an identification of local processing modules corresponding to a manipulation of components associated with the vehicle frame includes:
    identifying one or more processing modules for manipulating each component associated with the vehicle frame in a current region;
    identifying an offset corresponding to the current region; and
    dynamically associating the offset with the one or more identified processing modules.

11. The method as recited in claim 7, wherein the one or more processing modules correspond to instructions for manipulating an automated robotic system.

12. The method as recited in claim 11, wherein the cumulative set of processing modules correspond to instructions for painting the vehicle frame and the one or more components mounted on the vehicle frame.

13. A computer-readable medium having computer-executable modules for generating a set of programming instructions corresponding to the manipulation of a vehicle frame comprising:
    a modeling module for generating a representation of a vehicle frame subdivided into a plurality of regions each representing a portion of the vehicle frame, wherein the representation includes an identification of one or more components mounted on the vehicle frame; and
    a program synthesis module for obtaining an identification of processing instructions corresponding to a manipulation of components associated with the vehicle frame by region and for compiling a cumulative set of processing instructions for the vehicle frame from the local processing instructions from each region, wherein the compiling performed by the program synthesis module includes, for each region:
      calculating an offset for the region based on a longitudinal reference location of the vehicle frame;
      adjusting the local processing instructions based on the offset; and compiling the adjusted local processing instructions into the cumulative set of processing instructions.

14. The computer-readable medium as recited in claim 13, wherein the modeling module is configured to generate a representation of the vehicle frame that is subdivided into four regions wherein at least two regions include an axle of the vehicle frame.

15. The computer-readable medium as recited in claim 13, wherein the program synthesis module is configured to identify one or more local processing instructions for manipulating each component associated with the vehicle frame in a current region.

16. The computer-readable medium as recited in claim 15, wherein the program synthesis module is configured to associate the offset with the one or more identified local processing instructions for manipulating each component mounted on the vehicle frame in a current region.

17. The computer-readable medium as recited in claim 13, wherein the one or more local processing instructions correspond to instructions for manipulating an automated robotic system.

18. The computer-readable medium as recited in claim 13, wherein the cumulative set of processing instructions correspond to instructions for painting the vehicle frame and the one or more components mounted on the vehicle frame.

19. The computer-readable medium as recited in claim 13, wherein the modeling module obtains a vehicle identifier corresponding to the vehicle frame and recalls a representation of the vehicle frame corresponding to the vehicle identifier.

20. The method as recited in claim 1, further comprising causing the cumulative set of processing instructions to be executed to manipulate the vehicle frame.

21. The computer-readable medium as recited in claim 13, wherein the compiling performed by the program synthesis module includes calculating an offset for a region based on at least one offset calculated for a different region.

* * * * *